United States Patent [19]

Robin et al.

[11] 3,892,831

[45] July 1, 1975

[54] METHOD OF MANUFACTURE OF TENNIS RACKETS OF REINFORCED SYNTHETIC MATERIAL

[76] Inventors: Jacques André Robin, 125 Boulevard Malesherbes, Paris 17; Michel Roger Guyot, 17 rue des Quatre Vents, Paris 6, both of France

[22] Filed: May 11, 1973

[21] Appl. No.: 359,404

Related U.S. Application Data

[63] Continuation-in-part of Ser. No. 160,758, July 8, 1971, abandoned.

[30] Foreign Application Priority Data

July 29, 1970 France .............................. 70.27924

[52] U.S. Cl. ................. 264/103; 264/231; 264/314
[51] Int. Cl. .............................................. B29c 27/26
[58] Field of Search ........... 264/137, 231, 314, 103, 264/160, 758; 273/73 C, 73 F

[56] References Cited
UNITED STATES PATENTS

| 1,504,547 | 8/1924 | Egerton ........................ 264/314 X |
| 3,270,111 | 8/1966 | Haldemann ...................... 264/231 |
| 3,641,230 | 2/1972 | Jenks .................................. 264/314 |
| 3,787,051 | 1/1974 | Johns .................................. 273/73 F |

FOREIGN PATENTS OR APPLICATIONS 208,945  1954  Australia .......................... 273/73 C

*Primary Examiner*—Richard R. Kucia
*Attorney, Agent, or Firm*—Cameron, Kerkam, Sutton, Stowell & Stowell

[57] ABSTRACT

A tennis racket frame is formed in a mold from superposed tubes of reinforced synthetic materials covered with woven layers of glass fiber and the like impregnated with a polymerizable synthetic material. The tubes are inflated in the mold and the material polymerized. The layers are disposed to form reinforced webs between them and to band the tubes together. The tubes may be disposed about the heart of the racket and the hoop in various ways to resist the forces at the junction of the hoop and handle of the racket frame.

4 Claims, 8 Drawing Figures

METHOD OF MANUFACTURE OF TENNIS RACKETS OF REINFORCED SYNTHETIC MATERIAL

REFERENCE TO RELATED APPLICATION

This application is a continuation-in-part of our application Ser. No. 160,758, filed July 8, 1971, now abandoned.

BACKGROUND OF THE INVENTION

The present invention relates to a new process for the manufacture of tennis racket frames out of reinforced synthetic material such that the resulting racket has improved mechanical characteristics over those obtained from the use of a plastic material.

The particular characteristics of reinforced synthetic materials have already been used in numerous applications for uses requiring high mechanical strength as in Aeronautics, mechanical constructions, and in the sports. For this reason, these materials have been used in the fabrication of tennis rackets and a process is known for the fabrication of the body of the racket in which a slab of flexible plastic material covered with a polymerizable synthetic material reinforced by glass fibers is inflated to conform it to the wall of a mold to thus obtain a hollow tube.

However, with respect to this known process, and in spite of the high resistance of reinforced synthetic materials to traction and to flexure and further in spite of the excellent properties of reinforced synthetic materials in the distribution and resistance to forces, their flow under weight, their low module of elasticity to bending as well as the lack of conformity between the orientation of the working surfaces and the pressures which are applied to the racket, these characteristics do not permit reinforced synthetic materials, even the most highly developed, within the limit of the thicknesses required by weight requirements, to provide a molded racket frame of simple tubular construction capable of resisting, without irreversible deformation of the body or the alteration of the hoop, the static forces due to the tension of the strings (which tension is large for highest performance) and the dynamic forces due to the impact and return of the balls.

The general structure of the body of a tennis racket poses certain problems. The structure of the handle of the racket can be determined without too much difficulty which at its extremity is required only to undergo limited shrinking pressures. Independently of all general theories of the structure of the racket, the structure of the hoop, presents different problems because it undergoes all static and dynamic pressures of the structure of the body at the point of junction with the handle. The handle thus constitutes a fixed point and the hoop is at the epicenter on which are applied the dynamic forces. The localization and concentration of the forces are incompatible with the intrinsic properties of the reinforced synthetic material. It is therefore necessary to overcome these pressures by a continuous formation of the structure.

One of the principal objects of the present invention is to resolve these problems while avoiding the deficiencies of known processes. In accordance with the present invention, the entire body of the racket frame (hoop and handle), in place of the simple tubular structure as now known and as discussed above, is formed of at least two hollow elementary structures extending from the base of the handle around the hoop and return to the base of the handle applied to each other in such a way as to create between them one or more reinforced webs. This structure made of multiple tubes is covered over its entire periphery by a supplementary structure or cover forming a banding to avoid any risk of delamination. This banded structure made of multiple tubes has a particular arrangement, between a point of departure at the base of the handle and a return point at the base of the handle, to obtain, using a known molding principle, a tennis racket frame having at the point of localization and concentration of forces at the "heart" between the hoop and the handle, a continuity and a resistance compatible with the mechanical requirements imposed for its utilization.

BRIEF DESCRIPTION OF THE DRAWINGS

Other characteristics and other advantages of the present invention will appear more clearly from the following description of an illustrative embodiment thereof. This preferred embodiment is shown in the accompanying drawings, in which like reference characters indicate like parts, and in which

As seen in FIGS. 1–4, mold 1 has base 20, a top 21 and side elements 22 and 23 forming a zone of rectangular cross-section 24 within which are placed two semi-rigid hollow rings 2 and 3 having a diameter chosen as a function of the cross-section of the racket frame and as a function of the size of mold 1 in such a way that when they are in place in the mold, there can be no chance for them being side by side in the part but must necessarily be superposed as seen in FIG. 1. These hollow rings can be perforated in such a way that in case of accidental folding of the inflatable sheath 4, the passage of air over the entire length of the sheath is obtained to expand it. Inflatable sheaths 4 are mounted on rings 2 and 3 and continuous tubular elementary coverings 5 woven from glass fibers or other filamentary materials are mounted on and cover sheaths 4. The fibers which make up covers 5 are intercrossed between them at an angle of about 90° and form with the longitudinal axis of the sheath an angle of about 45°. These elementary covers 5 are therefore made up of filamentary elements in which the helicoidal turns are alternated from one side to another of their longitudinal axis.

This double tubular structure is in turn surrounded by another continuous tubular cover 6 of woven filamentary material having a diameter determined by the sections of the assembly and by the banding effect desired. The texture and the unitary weight of covers 5 and 6 are determined as a function of the desired mechanical properties and of the weight of the racket to be produced. Covers 5 and 6 are impregnated with a synthetic polyermizable material after being placed in the mold which material is polymerized after expansion of the inflatable sheaths 4.

Figures 1, 2, 3, 4:
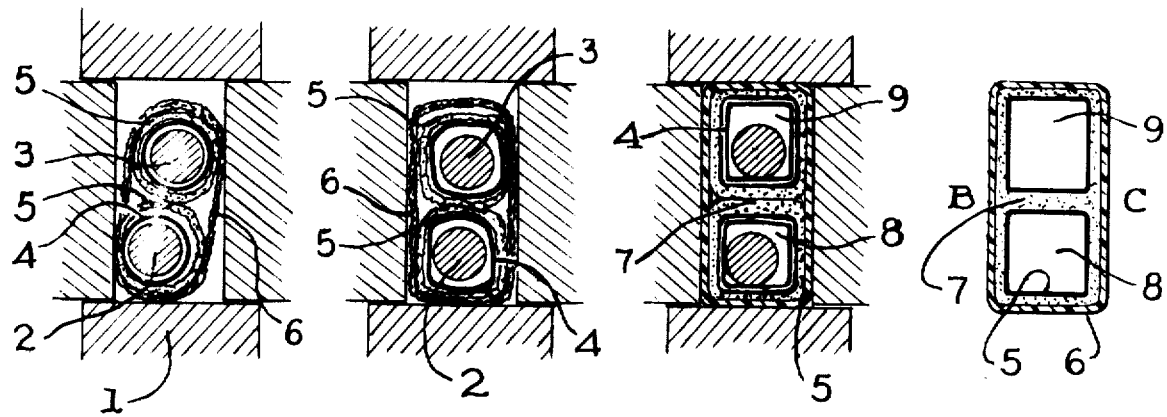
FIGS. 1–4 show successive steps in formation of a double tubular structure of this invention on the line A—A' of FIG. 5.

FIG. 1 shows the first step in the preparation of the structure. The structure of multiple tubes of sufficient continuous length is placed in the mold and the top 21 secured to base 20. The structure in the mold is then impregnated with synthetic material through opening 24. Air under pressure is then admitted within sheaths 4 thus placed in the mold causes covers 5 and 6 to expand little by little as seen in FIG. 2 until they come into contact with the walls of the mold as is shown in FIG. 3. Because of the superposed position of the central rings 2 and 3, a medial web 7 is formed horizontally at the line of contact of the lower cover with the upper cover. Polymerization of the synthetic material is then produced in this double structure. Cavities 8 and 9 are then separated by a horizontal medial web 7 which reinforces the central structure between the points B and C of FIG. 4 in the plane of the strings of the racket. After polymerization, rings 2 and 3 can be removed from cavities 8 and 9 if it is necessary to limit the weight of the structure to thus obtain, as seen in FIG. 4, an elementary double tubular structure banded about its periphery in accordance with the present invention.

Figure 7:
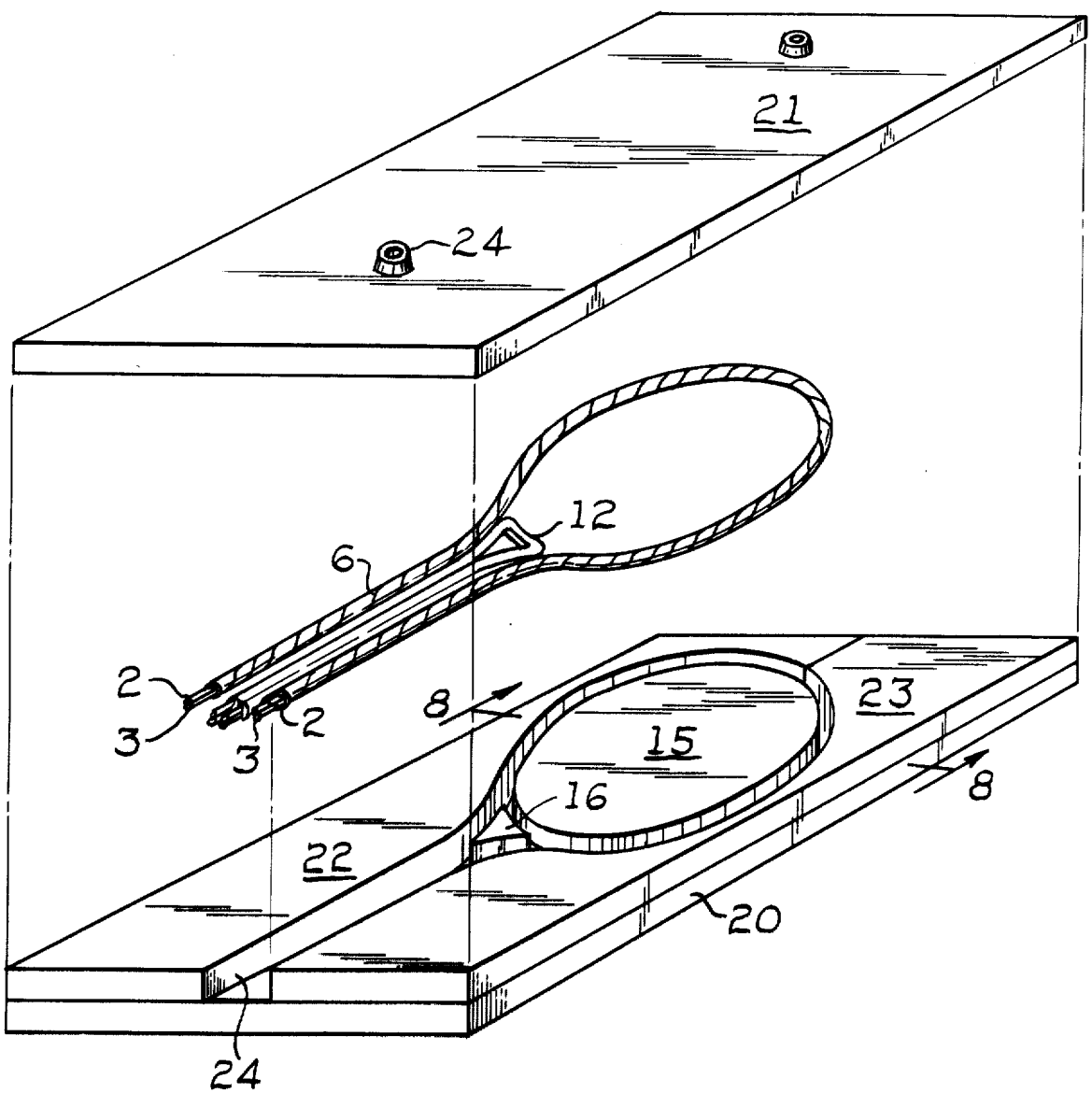
FIGS. 7 and 8 are detailed views of the mold and of the frame in plan view.
Figure 8:
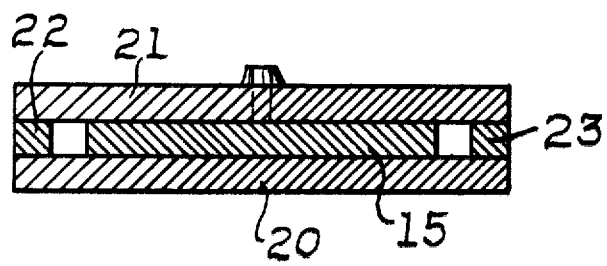

The double structure above-described is formed around the oval part 15 and the triangular part 16 of mold 10 (FIGS. 5 and 7) which correspond, respectively, to the hoop 25 and to a central portion or "heart" 16 of the tennis racket frame.

Figure 5:
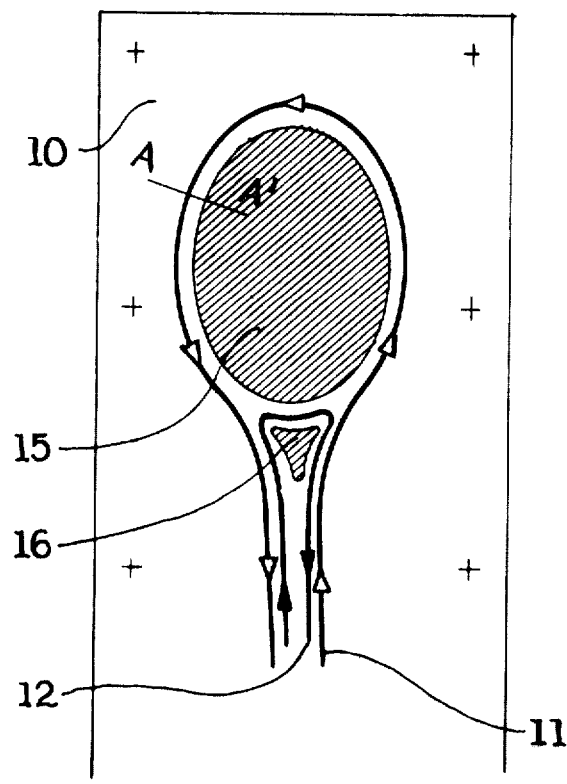
FIGS. 5 and 6 show two arrangements for the double structure of the present invention to form the tennis racket frame.
Figure 6:
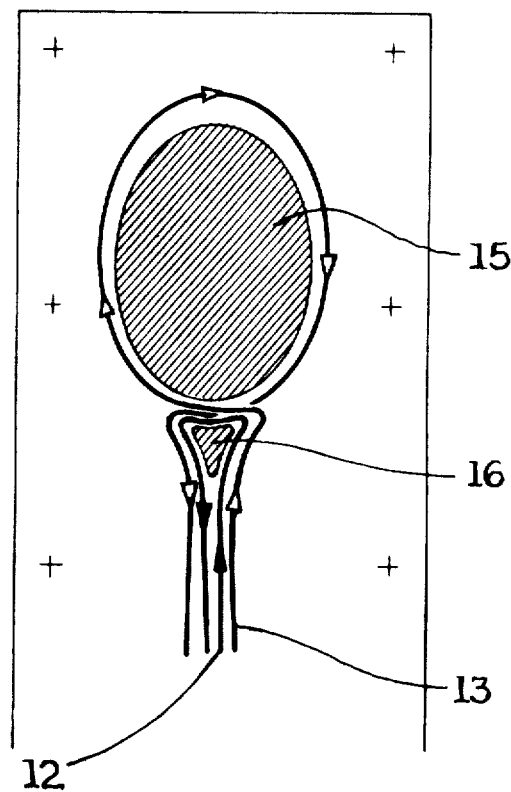

FIG. 5 shows a first arrangement 11 of the double tubular construction one portion of which begins at the base of the handle and surrounds the outside of triangular part 16 and the other portion forms the hoop 25 in the direction of the arrows and returns to the base of the handle. In this arrangement the zone of localization of the dynamic forces at the point of junction, triangle or "heart" 16, is reinforced by the horizontal portion of the double tubular structure 12 between the oval 15 and the triangular part 16.

It is to be understood that the arrangement of double tubular structures seen in FIG. 5 is by way of illustration and are not limiting. Other arrangements of the parts 8 and 9 of the double tubular structures can be used without departing from the present inventive concept.

In specific examples of the present concept, the sheaths 4 were made of thermoplastic cellulose, polyethylene and polyamide of from 3/100 to 8/100 mm. in thickness and their diameter is a function of the size of spaces 8 and 9. The rings 2 and 3 were extruded thermoplastic material and rubber and the coverings 5 and 6 were continuous tubes woven from glass fibers. The coverings 5 and 6 were reinforced with fibers of greater resistance to an average weight of 50 grams per meter with diameters as described above.

The polymerizable plastic material was a thermohardening polyester resin and epoxy resin and the covers 5 and 6 were impregnated by known means, either manual injection or pre-impregnation.

The pressure of inflation of sheaths 5 was based upon the amounts of fibers and of resin and the weight and resistance of the finished product. Means for its evacuation of resin were provided at 27 in FIG. 7 in case coverings 5 and 6 were impregnated with an excess of resin. The inflation pressure was compensated by appropriate apparatus for closing the mold.

Hardening of the resin was at ambient temperature but the manufacturing cycle can be reduced in time with resulting reduction in cost if the hardening time is reduced by heating of the coverings and resin to a temperature determined by the nature of the resin, usually a temperature on the order of 120° C.

It is therefore apparent that the present invention provides a tennis racket frame which resists perfectly the static and dynamic forces discussed above because of the reinforcing web 7 parallel to the forces of tension applied by the strings and because the double structure is banded and is disposed in a preferred continuous arrangement.

We claim:

1. Process for the manufacture of tennis racket frames from woven tubular sheaths of filamentary synthetic reinforced material impregnated with a polymerizable synthetic material, the steps of placing at least two superposed inflatable sheaths having long axes in contact with their long axes parallel, connecting the superposed sheaths to each other and forming between them at least one reinforcing web of intercrossed filamentary material the filaments of which are at approximately 45° to the longitudinal axis of the sheaths, surrounding the superposed connected sheaths over their entire peripheries with a supplementary woven cover banding the sheaths together, disposing the resulting superposed banded structure of multiple tubes in a mold which maintains the superposed structure and having the shape of a tennis racket frame with said resulting banded structure of multiple tubes forming an integral handle and hoop to reinforce the tennis racket frame at the points of localization of forces to give a banding effect, impregnating the structure of multiple tubes with a polymerizable synthetic material, inflating the sheaths, web and cover into contact with the mold and then polymerizing the polymerizable synthetic material.

2. A process as described in claim 1, including the steps of first inserting hollow semi-rigid rings of smaller diameter than the sheaths in two inflatable sheaths and then superposing said rings and said sheaths in contact.

3. Process as described in claim 2, the further step of removing said rings from said sheaths after hardening of the polymerizable synthetic material.

4. Process as described in claim 1, the frame having a hoop and a heart, the step of disposing the banded structure of multiple tubes in the mold including surrounding the hoop and the heart of the racket frame therewith and disposing a part of the structure of multiple tubes around the heart of the racket frame.

* * * * *